United States Patent
Weir et al.

(10) Patent No.: US 8,691,376 B2
(45) Date of Patent: Apr. 8, 2014

(54) SELF-DECONTAMINATING INORGANIC COATINGS CONTAINING SEMICONDUCTOR METAL OXIDE NANOPARTICLES

(75) Inventors: John Douglas Weir, Huntington, NY (US); Ronald Gary Pirich, Islip, NY (US); Donald DiMarzio, Northport, NY (US); Dennis J. Leyble, Great River, NY (US); Steven Chu, Ronkonkoma, NY (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 851 days.

(21) Appl. No.: 12/034,412

(22) Filed: Feb. 20, 2008

(65) Prior Publication Data

US 2010/0003498 A1 Jan. 7, 2010

(51) Int. Cl.
*C09D 1/00* (2006.01)
*B32B 5/16* (2006.01)
*B32B 17/10* (2006.01)
*B32B 27/08* (2006.01)
*B32B 27/38* (2006.01)
*B32B 27/00* (2006.01)

(52) U.S. Cl.
USPC ........... 428/323; 428/332; 428/334; 428/335; 428/336; 428/413; 428/423.1; 106/286.1; 106/286.4; 106/286.5; 106/286.6

(58) Field of Classification Search
None
See application file for complete search history.

(56) References Cited

U.S. PATENT DOCUMENTS

| | | | |
|---|---|---|---|
| 5,503,840 A | 4/1996 | Jacobson et al. | |
| 5,972,831 A * | 10/1999 | Poncelet et al. | 502/304 |
| 6,217,999 B1 * | 4/2001 | Zhang et al. | 428/312.6 |
| 6,576,344 B1 * | 6/2003 | Doushita et al. | 428/426 |
| 6,653,356 B2 | 11/2003 | Sherman | |
| 6,800,354 B2 * | 10/2004 | Baumann et al. | 428/141 |
| 2004/0109853 A1 * | 6/2004 | McDaniel | 424/94.6 |
| 2004/0224145 A1 * | 11/2004 | Weir et al. | 428/323 |

OTHER PUBLICATIONS

AZ Technology, Inc., Spacecraft Thermal Control (TC) Coatings and Services Catalog, Jan. 2004.

* cited by examiner

*Primary Examiner* — Sheeba Ahmed
(74) *Attorney, Agent, or Firm* — Alan G. Towner, Esq.; Pietragallo Gordon Alfano Bosick & Raspanti, LLP

(57) ABSTRACT

UV resistant inorganic coatings which exhibit photochemical activity that destroys toxic biological and chemical agents are disclosed. The inorganic coatings include semiconductor metal oxide nanoparticles that are photo-chemically active dispersed in an inorganic binder. In one embodiment, anatase titanium dioxide nanoparticles are dispersed in a silicon dioxide or silicate binder. Applications may include spacecraft, aircraft, ships, military vehicles, high value equipment and buildings such as subway stations, hospitals, railroad stations and stadiums.

22 Claims, No Drawings

SELF-DECONTAMINATING INORGANIC COATINGS CONTAINING SEMICONDUCTOR METAL OXIDE NANOPARTICLES

FIELD OF THE INVENTION

The present invention relates to self-decontaminating inorganic coatings, and more particularly relates to coating compositions containing semiconductor metal oxide nanoparticles which protect surfaces from biological and chemical contaminants. The coatings are useful in various applications such as spacecraft, aircraft, ships, military vehicles and equipment, and public buildings.

BACKGROUND INFORMATION

Titanium dioxide in its rutile crystalline form is widely used as an inert pigment in coatings. Rutile $TiO_2$ is relatively photo-chemically inert, and protects paints from degradation by scattering absorbed light.

Another crystalline form of $TiO_2$, known as anatase, is photo-chemically active in comparison with the inert rutile form of $TiO_2$. Due to its photo-chemical activity, anatase $TiO_2$ is known to cause heavy chalking when added to paints. In order to solve the chalking problem and still maintain the advantages of anatase $TiO_2$ for its photo-chemical reactivity, it would be desireable to have an inorganic coating system that is photo-chemically inert to UV radiation and very resistant to oxidation by hydroxyl radicals.

SUMMARY OF THE INVENTION

The present invention relates to UV resistant inorganic coatings which exhibit photo-chemical activity that destroys toxic biological and chemical agents. Toxic agents can include spores of anthrax, all forms of bacteria and viruses and/or combinations of other toxic and communicable diseases, as well as nerve gas and other hazardous chemicals. The inorganic coatings include semiconductor metal oxide nanoparticles that are photo-chemically active. Applications may include spacecraft, aircraft, ships, military vehicles, high value equipment and buildings such as subway stations, hospitals, railroad stations, stadiums and the like.

An aspect of the present invention is to provide a coating composition comprising: an inorganic binder, and photo-chemically active semiconductor metal oxide nanoparticles.

Another aspect of the present invention is to provide a cured coating comprising: an inorganic binder, and photo-chemically active semiconductor metal oxide nanoparticles dispersed in the inorganic binder.

A further aspect of the present invention is to provide a coated substrate comprising: a substrate, and a photo-chemically active coating covering at least a portion of the substrate. The photo-chemically active coating comprises: an inorganic binder, and photo-chemically active semiconductor metal oxide nanoparticles dispersed in the inorganic binder.

These and other aspects of the present invention will be more apparent from the following description.

DETAILED DESCRIPTION

The addition of certain semiconductor metal oxide nanoparticles to coatings provides the capability of oxidizing organic matter on the surface of the coatings. Suitable semiconductor oxides include the anatase or tetragonal crystalline form of $TiO_2$, the cubic crystalline form of $WO_3$, the zincite or hexagonal crystalline form of ZnO, the cassiterite or tetragonal crystalline form of $SnO_2$, the fluorite or cubic crystalline form of $ZrO_2$, the rutile or orthogonal crystalline form of $CrO_2$ and the oxoantimonate or tetragonal crystalline form of $SbO_4$. For example, the anatase form of $TiO_2$ absorbs UV radiation and, in the presence of surface moisture, generates highly oxidative hydroxyl radicals. These hydroxyl radicals oxidize and decompose organic material, including living material such as bacteria, spores and viruses, as well as hazardous chemicals. This photo-catalytic process is self-sustaining with UV stimulation along with surface moisture derived from ambient humidity. The self-decontaminating and self-cleaning feature is incorporated into a coating that can be used to protect surfaces from biological and chemical contamination.

The self-decontaminating properties of the semiconductor metal oxide nanoparticles of the present invention may be determined by standard UV techniques in which the powder or a coating in which the powder is dispersed is irradiated and its emission spectra in the visible wavelength regime is measured. A pH changing powder, e.g., methyl orange powder, which changes its color/pH (visible wavelength emissivity) with exposure to various radicals, may be used as the contaminant surrogate. Such pH-changing powder compounds may be used to determine the efficiency of OH radical production and correlate with expected neutralization/decontamination of actual contaminants such as chemical contaminants and biological pathogens.

In addition to the photo-chemically active semiconductor metal oxide nanoparticles, the present coating compositions comprise an inorganic binder. In certain embodiments, the inorganic binder comprises silicon dioxide and/or alkaline silicates in amounts of from about 5 to 60 weight percent of the coating composition. For example, silicon dioxide typically comprises from about 20 or 30 weight percent up to about 40 or 50 weight percent of the coating composition. Alternatively, the coating compositions may typically comprise from about 10 to about 30 weight percent alkaline silicate. Typical alkaline silicates include sodium silicate, sodium disilicate, magnesium aluminum silicate and the like.

The photo-chemically active semiconductor metal oxide nanoparticles typically comprise from about 1 to about 30 weight percent of the coating composition. For example, the photo-chemically active semiconductor metal oxide nanoparticles may comprise from about 1 to about 10 weight percent of the coating composition. The photo-chemically active semiconductor metal oxide nanoparticles typically have an average size of less than 100 nm, typically from about 20 to about 50 nm.

Since photo-catalytic reactions can degrade the organic resin component of conventional coatings, the resin system of the present invention is selected such that it does not degrade over time. The semiconductor metal oxide nanoparticles, such as anatase $TiO_2$, are small enough not to scatter visible light or act as a light blocking pigment.

In addition to the inorganic binder and photo-chemically active semiconductor metal oxide nanoparticles, the present coating compositions may comprise a solvent. Typical solvents include water or conventional organic solvents, with water being a particularly preferred solvent for many coating compositions.

The present coating compositions may further comprise additional ingredients such as refractory metal oxide fillers, aluminum oxide, aluminum pigments, hardeners and the like. The coating compositions may be made by mixing the starting ingredients by any suitable conventional means.

In one embodiment, the coating composition comprises from 10 to 50 weight percent silicon dioxide, from 10 to 30 weight percent aqueas alkali silicate, from 1 to 30 weight percent photo-chemically active semiconductor metal oxide nanoparticles, from 5 to 15 weight percent aluminum oxide, and less than 5 weight percent chromium oxide. In another embodiment, the coating composition comprises from 20 to 40 weight percent aluminum metal powder, from 20 to 40 weight percent zinc dust, from 1 to 30 weight percent aqueous alkali silicate, from 1 to 30 weight percent photo-chemically active semiconductor metal oxide nanoparticles, and from 20 to 25 weight percent water.

The present coating compositions may be applied to various substrates by any suitable means such as spraying, brushing, dipping, rolling and the like. The coating compositions may be cured at room temperature or any other suitable temperature for times of from 1 hour to 30 days or more. For example, the coating may be held at relatively high humidity (50 to 80 percent) for two days at room temperature, followed by lowering the humidity by about 10 percent per day until the coating reaches ambient humidity (about 30 percent) for a total cure time of about one week.

Once the coating compositions have been applied to a substrate and cured, they typically have dry film thicknesses of from about 1 to about 15 mils. For example, a thickness of from about 3 to about 8 mils may be suitable for various applications.

In accordance with an embodiment of the present invention, an overcoat layer may be applied over at least a portion of the photo-chemically active coating. Suitable overcoat layers may comprise polyurethane resin, alkyd resin and/or epoxy resin. The dry film thickness of such overcoat layers is typically from about 0.1 to about 5 mil, typically from about 0.25 to about 0.5 or 1 mil. In one embodiment, the overcoat layer may optionally include photo-chemically active semiconductor metal oxide nanoparticles of the types and amounts discussed above.

The present coatings are not limited by color, and can be formulated and retrofitted over existing coatings and structures. By controlling the particle size and distribution of the anatase titanium oxide or other semiconductor metal oxide nanoparticles within the coating, light scattering is not adversely affected, and the nanoparticles are available on or near the surface of the coating to cause reactions which produce hydroxyl radicals.

In one embodiment, anatase $TiO_2$ nanoparticles are added to silicate formulations such as highly heat reflective coatings used on spacecraft. Other suitable long-life resin systems may be utilized in the present coatings that are resistant to UV degradation, photochemical activity of the semiconductor metal oxide nanoparticles, and the effects of oxidation resulting from the formation of hydroxyl radicals.

In one embodiment, the coating composition and photo-chemically active semiconductor metal oxide nanoparticles is provided in the form of a water based ceramic slurry consisting of refractory oxide filler material dispersed in a silicate binder. After proper curing, the coating becomes a porous ceramic composite material which has excellent dielectric and thermal properties. The coating will dry to the touch at ambient temperatures, but it requires a heat cure of 650° F. (343° C.) for 30 minutes to achieve full cure. The coating can be applied by various methods including standard spray, dip and brush processes. It is effective in preventing oxidation and scaling of carbon and low alloy steels at temperatures up to 1200° F. The coating can also be used as a high temperature electrical insulator.

Surfaces to be coated with the present compositions should be free of any organic contamination. Cleaning with a water based alkaline cleaner is recommended. The surface should be roughened prior to coating by dry grit blasting with 90-120 mesh alumina grit, or other suitable method. The coating is supplied ready for use; no thinning is required. The coating should be well mixed prior to application. The coating can be typically applied to a dry film thickness of 2-5 mils (50-125 um) depending on the application process. Subsequent coats can be applied after the coating has dried properly. The coating may be cured by drying under ambient conditions for ten days. Parts may be handled and recoated after the coating has air dried for about 30 minutes. Full cure can be achieved by heating the coating to 650° F. for 30 minutes.

The following examples are intended to illustrate various aspects of the invention, but are not intended to limit the scope of the invention.

EXAMPLE 1

An inorganic coating comprising a silicate binder system with titanium dioxide anatase nanoparticles dispersed therein is made and applied to a surface as follows. Seventy weight percent of an organic silicate-based coating formulation commercially available under the designation AZ-93 from AZ Technology is combined with 30 weight percent of anatase $TiO_2$ having an average particle size of about 35 nm. The mixture is then applied to a substrate and cured at room temperature for 7 days. The cured coating has a dry film thickness of about 5 mils. The coating exhibits high stability as well as self-decontaminating and self-cleaning characteristics.

EXAMPLE 2

A coating made in accordance with Example 1 is overcoated with a coating formulation commercially available under the designation AZ-5000-PF from AZ Technology. The overcoating has a dry film thickness of about 0.5 mil and exhibits high stability as well as self-decontaminating and self-cleaning characteristics.

Whereas particular embodiments of this invention have been described above for purposes of illustration, it will be evident to those skilled in the art that numerous variations of the details of the present invention may be made without departing from the invention as defined in the appended claims.

The invention claimed is:

1. A curable coating composition comprising:
   a curable inorganic binder comprising an alkaline silicate comprising sodium silicate, sodium disilicate and/or magnesium aluminum silicate; and
   photo-chemically active semiconductor metal oxide nanoparticles comprising anatase $TiO_2$, cubic $WO_3$, zincite $ZnO$, cassiterite $SnO_2$, fluorite $ZrO_2$, rutile $CrO_2$ and/or oxoantimonate $SbO_4$.

2. The coating composition of claim 1, wherein the photo-chemically active semiconductor metal oxide nanoparticles comprise up to about 30 weight percent of the coating composition.

3. The coating composition of claim 1, wherein the photo-chemically active semiconductor metal oxide particles comprise from about 1 to about 10 weight percent of the coating composition.

4. The coating composition of claim 1, wherein the photo-chemically active semiconductor metal oxide particles have an average size of less than 100 nm.

5. The coating composition of claim 1, wherein the photo-chemically active semiconductor metal oxide particles have an average size of from about 20 to about 50 nm.

6. The coating composition of claim 1, wherein the semiconductor metal oxide nanoparticles comprise anatase $TiO_2$.

7. The coating composition of claim 1, further comprising a solvent.

8. The coating composition of claim 7, wherein the solvent comprises water.

9. The coating composition of claim 1, further comprising refractory oxide metal filler, aluminum oxide, pigment and/or hardener.

10. A cured coating comprising:
    a cured inorganic binder comprising an alkaline silicate comprising sodium silicate, sodium disilicate and/or magnesium aluminum silicate; and
    photo-chemically active semiconductor metal oxide nanoparticles dispersed in the cured inorganic binder.

11. The cured coating of claim 10, wherein the cured coating has a dry film thickness of from about 1 to about 15 mils.

12. The cured coating of claim 10, further comprising an overcoat layer covering at least a portion of the cured coating.

13. The cured coating of claim 12, wherein the overcoat layer has a dry film thickness of from about 0.25 to about 1 mil.

14. The cured coating of claim 12, wherein the overcoat layer comprises a polyurethane resin, alkyd resin and/or epoxy resin.

15. The cured coating of claim 14, wherein the overcoat further comprises photo-chemically active semiconductor metal oxide nanoparticles.

16. A coated substrate comprising:
    a substrate;
    a photo-chemically active coating covering at least a portion of the substrate, wherein the photo-chemically active coating comprises:
        a cured inorganic binder; and
        photo-chemically active semiconductor metal oxide nanoparticles dispersed in the cured inorganic binder; and
    an overcoat layer covering at least a portion of the photo-chemically active coating comprising a polyurethane resin, alkyd resin and/or epoxy resin.

17. The coated substrate of claim 16, wherein the substrate comprises an aircraft, ship, military vehicle or building.

18. The cured coating of claim 10, wherein the cured inorganic binder comprises silicon dioxide and/or an alkaline silicate.

19. The coated substrate of claim 16, wherein the cured inorganic binder comprises silicon dioxide and/or an alkaline silicate.

20. The coating composition of claim 1, wherein the curable inorganic binder further comprises silicon dioxide.

21. The cured coating of claim 10, wherein the cured inorganic binder further comprises silicon dioxide.

22. The coated substrate of claim 16 wherein the cured inorganic binder comprises an alkaline silicate comprising sodium silicate, sodium disilicate and/or magnesium aluminum silicate.

\* \* \* \* \*